May 29, 1945.　　　　G. A. BAIRD　　　2,377,201
LOGGING BUNK
Filed June 15, 1944　　　4 Sheets-Sheet 2

Inventor
GORDON A. BAIRD,
By Clarence A. O'Brien
and Harvey B. Jacobson
Attorneys May 29, 1945.　　　G. A. BAIRD　　　2,377,201
LOGGING BUNK
Filed June 15, 1944　　　4 Sheets-Sheet 4

Inventor
GORDON A. BAIRD,
By Clarence A. O'Brien
and Harvey B. Jackson
Attorneys

UNITED STATES PATENT OFFICE 2,377,201

LOGGING BUNK

Gordon A. Baird, Hopewell, Va.

Application June 15, 1944, Serial No. 540,501

2 Claims. (Cl. 214—65.3)

My invention relates to improvements in logging bunks, the principal object in view being to provide an inexpensive, simply constructed, power-driven logging bunk equipped with power means for loading the same.

Other and subordinate objects are also comprehended by my invention, all of which, together with the precise nature of my improvements, will be readily understood when the succeeding description and claims are read with reference to the drawings accompanying and forming part of this specification.

Figure 1:
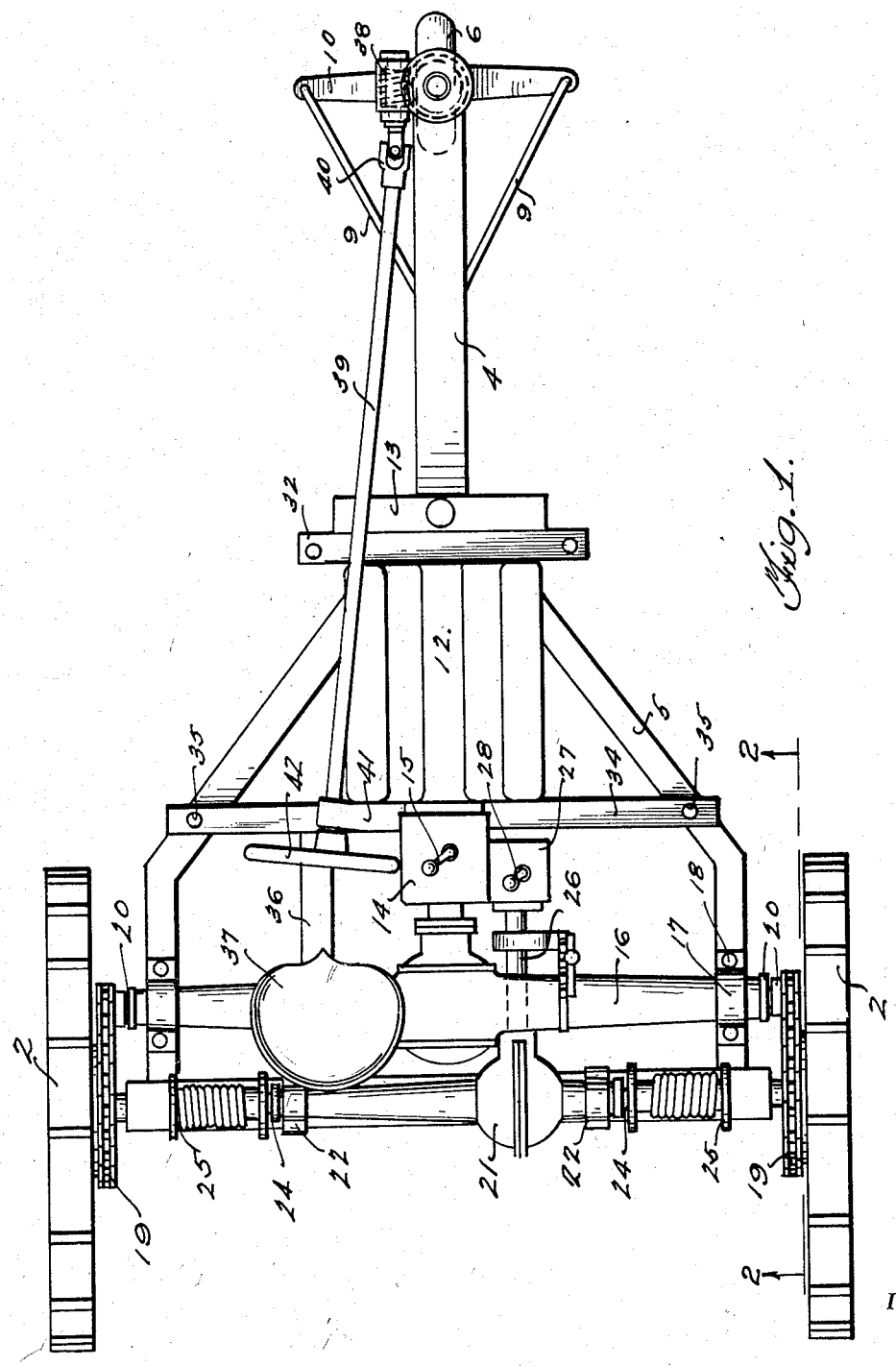
Figure 2:
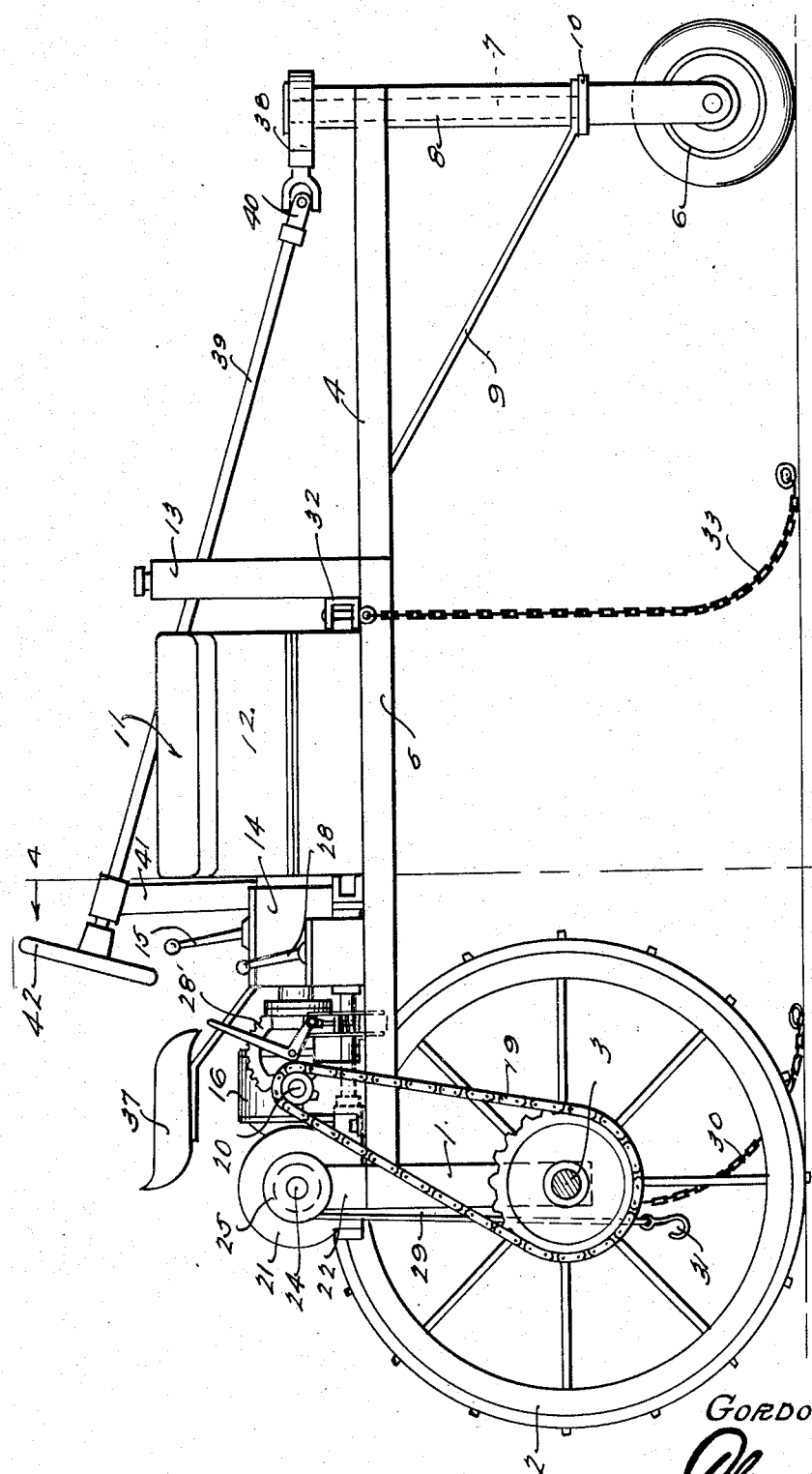
Figure 3:
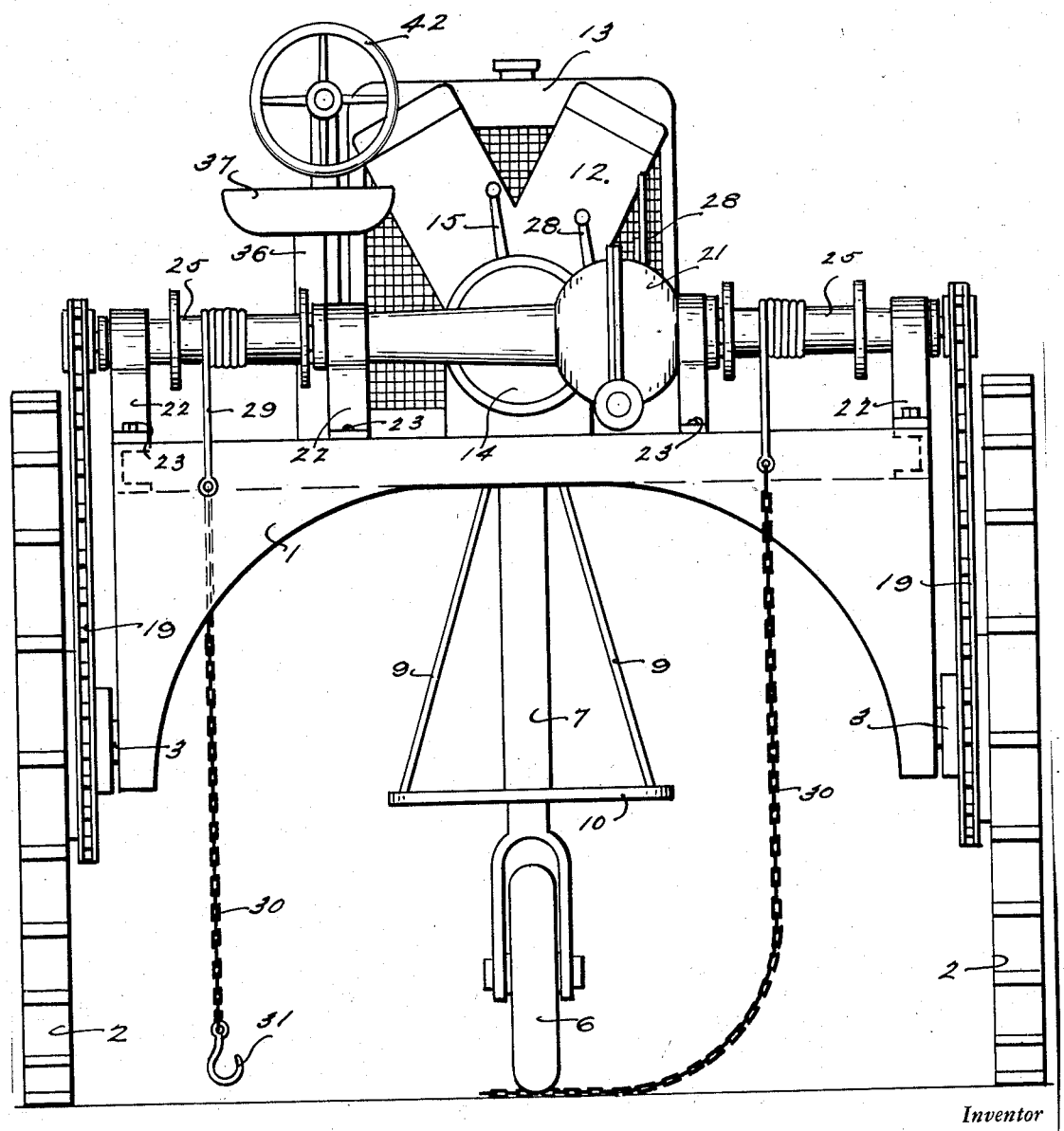
Figure 4:
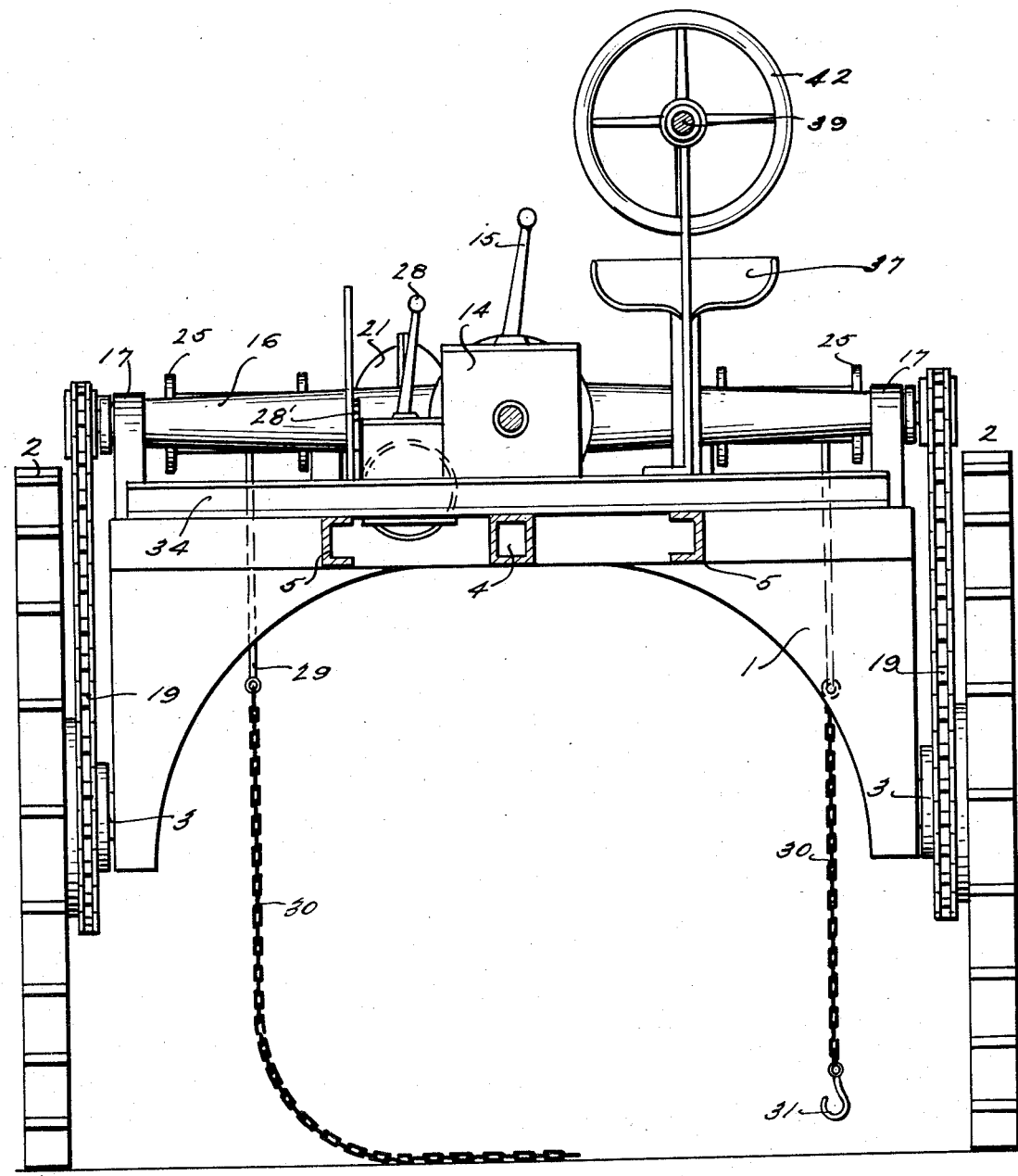

In said drawings:

Figure 1 is a view in plan of my improved logging bunk in its preferred embodiment, Figure 2 is a view in section taken on the line 2—2 of Figure 1, Figure 3 is a view in rear elevation, and Figure 4 is a view in transverse section taken on the line 4—4 of Figure 2.

Referring to the drawings by numerals, my improved logging bunk, as illustrated, comprises a rear, upwardly arched, wheel-carried bolster 1 equipped with a pair of traction wheels 2 rotatably mounted on stub axles, as at 3, a reach bar 4 extending forwardly from the bolster 1 and suitably secured to the upper edge portion thereof, and a pair of side braces 5 extending forwardly from said bolster 1 and converging forwardly to the reach bar 4 to which the front ends of said braces 5 are suitably secured in any usual manner.

The front end of the reach bar 4 is supported by a caster-type steering wheel unit 6 including a steering post 7 extended upwardly through a sleeve 8 suitably secured to said reach bar. Forwardly diverging strut rods 9 extend from the reach bar 4 to the outer ends of a transverse brace bar 10 on the bottom of the sleeve 8, said rods 9 and bar 10 functioning to brace the sleeve 8 and hence the steering unit 6 in a manner which will be clear.

Suitably mounted on the reach bar 4 and the braces 5 is a power plant 11 in the form of a truck motor 12, the radiator of which is shown at 13, and a truck transmission 14 in the rear of said motor and including the usual gear shift lever 15.

Between the transmission 14 and the stub axles 3, a conventional rear end differential drive assembly 16, such as used on the ordinary motor truck, is secured at its ends to the braces 5 by suitable clamps 17 and bolts 18 for operation by the transmission 14. A pair of sprocket and chain drives 19 extend between the outer ends of the axles 20 of the assembly 16 and the traction wheels 2.

A second rear end differential drive assembly, of the worm gear drive type, is mounted in the rear of the assembly 16 on the bolster 1 in brackets 22 upstanding from said bolster and secured thereto, as at 23. The second assembly 21 is adapted, in any suitable manner, as by locking the usual spider gears, not shown, for rotation of the shafts 24 thereof in synchronism and said shafts are extended out of the assembly 21 and equipped with a pair of cable winding reels 25 fast thereon and located at opposite sides of the bolster 1. The assembly 21 is designed to be driven through a suitable shaft 26 and a transmission 27, of the usual automobile type, to which the transmission 14 is operatively connected in any suitable manner. The transmission 27 is controlled by the usual gear shift lever 28. Any suitable type of brake, such as that designated as a unit by reference numeral 28', may be provided for the shaft 26.

A pair of cables 29 are suitably connected to the reels 25 with terminal chains 30 for passing under logs to be loaded and one of which may be provided with a suitable hook 31 for connection to a selected link of the other chain. At a suitable point forwardly of the motor 12, a transverse bar 32 extends across the reach bar 4 with the usual forward chain 33 attached to one end thereof for passing under logs to be loaded and attachment in any suitable manner of its other end to the other end of said bar 32.

A transverse bar 34 extends across the braces 5 in the rear of the motor 12 and is secured to said braces by bolts 35. A seat post 36 extends upwardly and rearwardly from said bar 34 and supports the usual driver's seat 37.

The steering post 7 is designed to be operated by any conventional type of worm driven steering mechanism, such as that designated 38 and to which a rearwardly and upwardly inclining steering shaft 39 is operatively connected by a universal joint 40. The rear end of the steering shaft 39 is journaled in an upstanding bearing bracket 41 rising from the bar 34 in front of the driver's seat 37, and is equipped with a suitable steering wheel 42.

The operation of my improved logging bunk will be readily understood. With the gear shift lever 15 in neutral position, thus disabling the drive to the wheels 2, or, if desired, the motor 12 stopped, the gear shift lever 28 may be set into neutral position to disconnect the shaft 26 from the transmission 27 so that by pulling on the chains 30, the cables 29 may be unwound from the reels 25 so that said chains may be passed under logs to be loaded and connected together in the manner already described, it being understood that when said shaft 26 is so disconnected, the reels 25 may be caused to idle reversely, under pull on said chains 30. With the front chain 33 suitably arranged around the front ends of the logs to lift said ends off the ground, the gear shift lever 28 may be set so that the transmission 28 will drive the assembly 21, and hence the wheels 25, to wind up the cables 29 and lift the rear ends of the logs off the ground so that said logs are suspended at their rear ends from the reels 25. The speed at which the reels 25 are driven may be predetermined by appropriate setting of the lever 28 to correspondingly condition the transmission 27, as will be clear. The manner in which the drive to the wheels 2 may be initiated and controlled will be readily understood without detailed explanation. In unloading logs, if the gear shift lever 28 is set to neutral and the shaft 26 thus conditioned for idling, the reels 25 will be caused to rotate so as to unwind the cables 29 and lower the logs, at their rear ends, under the weight of the load on said cables 29. In this operation, the shaft 26 may be snubbed, or stopped, likewise the reels 25, as occasion may require, by means of the brake mechanism 28.

Since the motor 12, transmissions 14 and 27, together with the assemblies 16 and 21, are of conventional form, as previously indicated, it has not been considered necessary to illustrate nor describe the details of construction thereof.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a logging bunk, a frame, a pair of rear ground wheels supporting said frame, a motor-operated differential drive for said wheels comprising a variable speed transmission, cable winding reels on said frame, and means to drive said reels in unison comprising a second variable speed transmission operative by the transmission first mentioned.

2. In a logging bunk, a frame, a rear carriage bolster supporting said frame, a pair of rear ground wheels supporting said bolster, a motor drive for said wheels, a pair of cable winding reels mounted on the rear end of said frame at opposite sides thereof, respectively, a pair of cables on said reels including end logging chains and adapted to be unwound from said reels to depend in the rear of said bolster, a variable speed drive for said wheels operative by said motor drive and including a transmission, and a second variable speed drive for operating said reels in unison comprising a second transmission operative by the transmission first mentioned.

GORDON A. BAIRD.